United States Patent [19]
Yanagawa et al.

[11] Patent Number: 5,535,407
[45] Date of Patent: Jul. 9, 1996

[54] DATA PROCESSING SYSTEM FOR LOCALLY UPDATING CUSTOMER DATA DISTRIBUTED BY A HOST COMPUTER TO A REMOTE FACILITY AND FOR RETURNING THE UPDATED CUSTOMER DATA TO THE HOST COMPUTER

[75] Inventors: Atsuyuki Yanagawa; Hisao Shimizu, both of Tokyo, Japan

[73] Assignee: Oki Electric Industry Co., Ltd., Tokyo, Japan

[21] Appl. No.: 201,712

[22] Filed: Feb. 25, 1994

Related U.S. Application Data

[63] Continuation of Ser. No. 530,185, May 29, 1990, abandoned.

[30] Foreign Application Priority Data

May 30, 1989  [JP]  Japan ................................. 1-134506

[51] Int. Cl.$^6$ ............................ G06F 15/16; G06F 17/60
[52] U.S. Cl. ...................... 395/800; 235/380; 364/DIG. 1
[58] Field of Search ............................ 395/800; 235/380

[56] References Cited

U.S. PATENT DOCUMENTS

| | | | |
|---|---|---|---|
| 4,625,276 | 11/1986 | Benton | 364/408 |
| 4,714,989 | 12/1987 | Billings | 364/200 |
| 4,774,664 | 9/1988 | Campbell et al. | 364/408 |
| 4,782,442 | 11/1988 | Kojima et al. | 364/200 |
| 4,841,442 | 6/1989 | Hosoyama | 364/405 |
| 4,891,503 | 1/1990 | Jewell | 235/380 |
| 4,914,587 | 4/1990 | Clouse | 364/408 |
| 4,992,647 | 2/1991 | Konishi et al. | 235/379 |
| 5,055,999 | 10/1991 | Frank et al. | 364/200 |
| 5,070,452 | 12/1991 | Doyle, Jr. et al. | 364/401 |
| 5,201,010 | 4/1993 | Deaton et al. | 382/7 |
| 5,206,488 | 4/1993 | Teicher | 235/380 |

*Primary Examiner*—William M. Treat
*Attorney, Agent, or Firm*—Spencer & Frank

[57] ABSTRACT

A customer data processing system includes a host computer for managing customer data and a plurality of processors interconnected with the host computer through telecommunications lines. The host computer has a first storage unit for storing customer data and a customer data batch extracting unit for extracting customer data with a high frequency of use out of the customer data stored therein and for transmitting the extracted customer data in a batch to the processors at predetermined times. Each processor has a second storage unit for storing the customer data fed in a batch from the host computer and local updating unit for updating customer data stored in the second storage unit when a transaction with a customer is concluded. Each processor also has a remote updating unit for updating customer data stored in the host computer through the telecommunications line. Also, each processor has a customer data batch updating unit for transmitting the customer data updated in the local updating unit to the host computer in batch at a predetermined times. In this way, transactions can be processed at high speed, resulting in improved efficiency and security against tapping and so forth.

3 Claims, 7 Drawing Sheets

Fig. 4A
CREDIT BALANCE
MANAGEMENT FILE

| BANK BRANCH OFFICE NO. |
| ACCOUNT NO. |
| CREDIT BALANCE |
| OVERDRAFT LIMIT AMOUNT |
| PAYABLE LIMIT AMOUNT |
| PASSWORD |
| WARNING CODE |

111

Fig. 4B
CUSTOMER
MANAGEMENT FILE

| CUSTOMER ID CODE |
| STORE NO. |
| BANK BRANCH OFFICE NO. |
| ACCOUNT NO. |
| CUSTOMER ATTRIBUTES |

112

Fig. 4C
MERCHANDISE PURCHASE
MANAGEMENT FILE

| CUSTOMER ID CODE | DATE & TIME | ARTICLE CODE | PURCHASING HISTORY |

113

DATA PROCESSING SYSTEM FOR LOCALLY UPDATING CUSTOMER DATA DISTRIBUTED BY A HOST COMPUTER TO A REMOTE FACILITY AND FOR RETURNING THE UPDATED CUSTOMER DATA TO THE HOST COMPUTER

This application is a continuation of application Ser. No. 07/530,185, filed May 29, 1990, now abandoned.

BACKGROUND OF THE INVENTION

1. Field of the Invention

The present invention relates to a customer data processing system, and more particularly to a centralized management system which includes a host computer and which manages customer data pertaining to transactions by computers at remote facilities, the customer data processing system being capable of efficiently updating the customer data.

2. Description of the Prior Art

FIG. 2 shows an example of a customer data processing system of the prior art. In the figure, a host computer 1 installed in a bank or a like facility is connected to store controllers 4 installed in stores 3A, 3B, and 3C, such as department stores, through a public telecommunications network 2. Each of stores 3A, 3B and 3C has a store controller 4 and POS terminals 5 connected to the store controller 4.

When a customer purchases goods at the store 3A using a credit card, for example, a POS (Point of Sales) terminal 5 is used for entering the transaction data and developing the transaction data. The store controller 4 includes a processor, et., and processes transaction data associated with transactions generated in each POS terminal 5. The store controller 4 also transmits messages containing the details of the transactions, or transaction messages formed in a predetermined format, to the host computer 1 through the public telecommunications network 2, and interprets transaction messages transmitted from the host computer 1 to notify the POS terminal 5 of the details.

A ledger file 6 incorporated in the host computer 1 stores customer data, including credit or debit balances of computers authorized to use a credit card at stores 3A, 3B, and 3C.

In the afore-mentioned system, when a computer transacts business with the store 3A, for example, using a credit card, the transaction data is fed from the POS terminal 5 to the store controller 4, formed into a transaction message in the store controller 4, and then transmitted to the host computer 1 through the public telecommunications network 2.

The host computer 1 checks the ledger file 6 to compare the associated customer's credit balance with the outstanding transaction amount of the customer. If the transaction amount is found to be within the credit balance, the host computer 1 judges the transaction acceptable, and then updates the credit balance as well as notifies the POS terminal 5 through the store controller 4 that the transaction has been concluded. The transaction terminates with the afore-mentioned procedure.

In the system described above, once a customer deposits a necessary amount of money in his or her predetermined account of a bank which controls the host computer 1, the customer can freely transact business with any one of the stores 3A, 3B, and 3C, using a credit card.

In the system as described above, since a transaction message has to be interchanged between the store controller 4 and the host computer 1 every time a customer generates a transaction, it takes a long time to process a single transaction. Consequently, for customers, it is time consuming to purchase goods, while for the stores, it is impossible to increase turnover due to the lower number of transactions.

To solve the problem, the number of terminals would be increased, but this would require an increase in the floor area of the stores, leading to a cost increase.

On the other hand, in order to solve the afore-mentioned problem, for example, when a transaction amount is within a predetermined amount, e.g., one thousand Japanese yen, that can be borne by a store, there is a system which concludes the transaction unconditionally without consulting with the host computer 1 at the time of the transaction and which sends the transaction data in a batch to the host computer 1 after the store is closed. This system aims at avoiding on-line processing, which requires much time to exchange a transaction message and updating, for small transaction amounts. In the host computer 1, based on the transaction data sent through batch transmissions from the stores after the stores are closed, the transacted amounts are substracted from the credit balances of the associated customers. This processing can be conducted at a high speed. However, there is a possibility that a transaction amount may exceed a customer's credit balance, causing an increased risk to the store or bank. Further, in Japanese patent laid-open publication No. 58596/1984, there is shown an automatic transaction system which is designed to communicate, as required, between a host computer having a user master file and an automatic transaction terminal to update the master file.

SUMMARY OF THE INVENTION

It is, therefore, an object of the present invention to provide a customer data processing system capable of processing transactions at a high speed, while avoiding the occurrence of transactional risk borne by stores or banks.

In accordance with the present invention, a host computer extracts in advance customer data with high frequency of use and transmits the customer data in a batch to a processor. The processor, for an appropriate customer, specifically for transactions with a customer using a plastic card very frequently, updates the customer data fed in a batch to conclude the transaction.

The customer data fed in a batch and updated in the processor is transmitted in a batch at a predetermined timing, for example, after the closing time of a store, to the host computer for updating the customer data stored therein. Since customer data with a high frequency of use is processed locally by the processor, there is essentially a transfer of part of the total burden of processing customer data to the processor from the host computer, and high speed processing can be realized in the processor.

Further, if a plurality of processors are connected to a host computer, and if a customer transacts business with a plurality of stores, the possibility that a transaction might be concluded beyond the user's credit balance should be considered. In order to avoid such situations, in accordance with the present invention, a transactionable amount contained in the customer data for a customer is allocated to those processors at the stage of extracting customer data which have been very frequently used, so that the total amount equals the credit balance contained in the original customer data.

In addition, in order to increase the degrees of freedom for transactions at each store, it is also possible to conclude a transaction with a customer in the range of an amount obtained by adding a given additional amount to the transactionable amount allocated to each processor.

Further, in accordance with the present invention, the customer data processing system is especially applicable to a POS system which interconnects a bank and stores to manage transactions with customers, while the processing system is also applicable to various types of systems which carry out central management of transaction data with customers.

BRIEF DESCRIPTION OF THE DRAWINGS

The objects and features of the present invention will become more apparent from a consideration of the following detailed description taken in conjunction with the accompanying drawings in which:

FIGS. 4A, 4B, and 4C exemplarily show the contents of customer data stored in a ledger file in the illustrative embodiment;

DESCRIPTION OF THE PREFERRED EMBODIMENT

Figure 1:
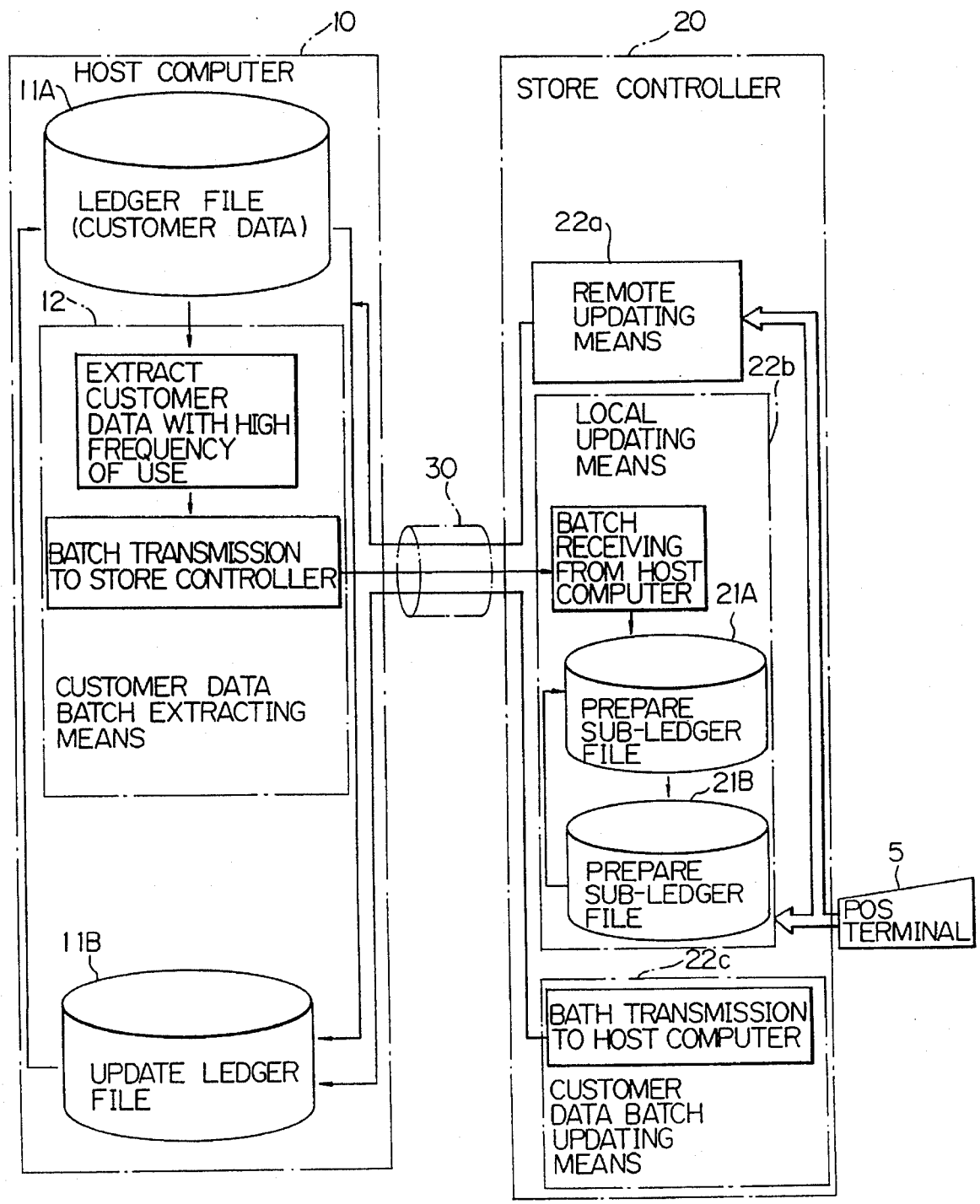
FIG. 1 is a block diagram schematically illustrating the basic configuration of a customer data processing system in accordance with the present invention.
Figure 2:
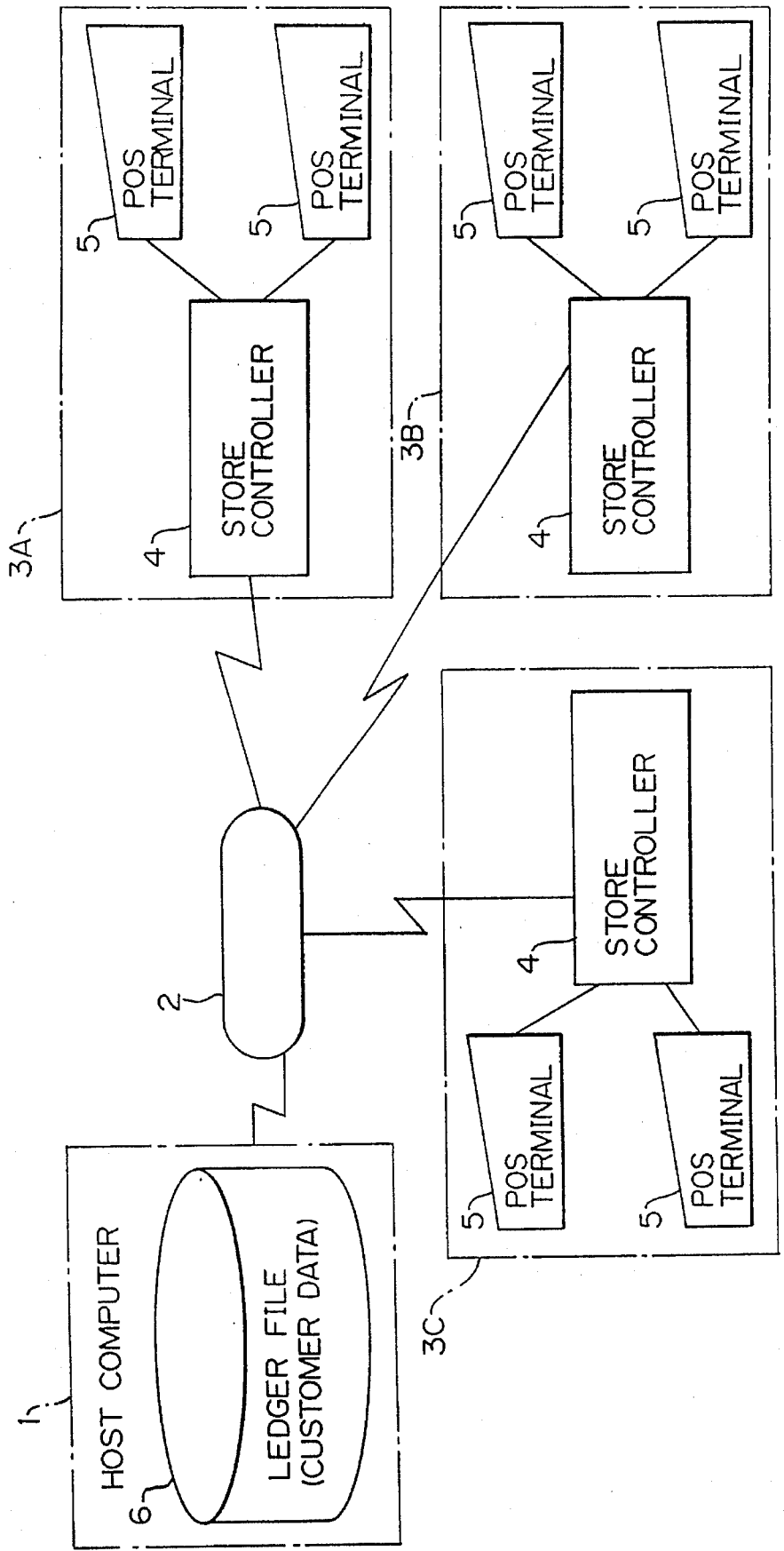
FIG. 2 is a block diagram schematically illustrating the configuration of a customer data system of the prior art.

FIG. 1 shows an illustrative embodiment of a customer data processing system of the present invention. The customer data processing system shown in the figure includes a host computer 10 and a processor, such as a store controller 20 interconnected to the host computer 10 by a telecommunications line 30.

In practice, the processing system includes a plurality of store controllers 20 connected to the host computer 10. For simplicity, FIG. 1 shows merely one of the store controllers 20. The telecommunications line 30 may be of a public telecommunications network or other communication channels for transmitting information.

The host computer 10 is provided with a ledger file 11 for managing customer data, and is also provided with a customer data batch extracting means 12. The extracting means is adopted for extracting customer data with high frequency of use out of the customer data stored in the ledger file 11 and for transmitting the extracted customer data in a batch to the store controllers 20 for processing.

POS terminals 5 are connected to the store controller 20. Only one POS terminal 5 is shown in FIG. 1, but in practice a plurality of POS terminals are connected to the store controller 20. The store controller 20 is provided with a remote updating means 22a, a local updating means 22b, and a customer data batch updating means 22c.

The remote updating means 22a, on receiving a transaction request from the POS terminal 5, assembles a message including the transaction data and transmits the transaction data to the host computer 10 to update customer data stored in the ledger file 11A of the host computer 10. The local updating means 22b receives customer data in a batch transferred from the customer data batch extracting means 12 of the host computer 10, prepares the sub-ledger file 21A, and concludes a transaction while updating the sub-ledger file 21A for a particular customer. The customer data batch updating means 22c, after a store closes, carries out batch transmission of the contents stored in the updated sub-ledger file 21B to the host computer 10 to update the customer data stored in the ledger file 11A.

Figure 3:
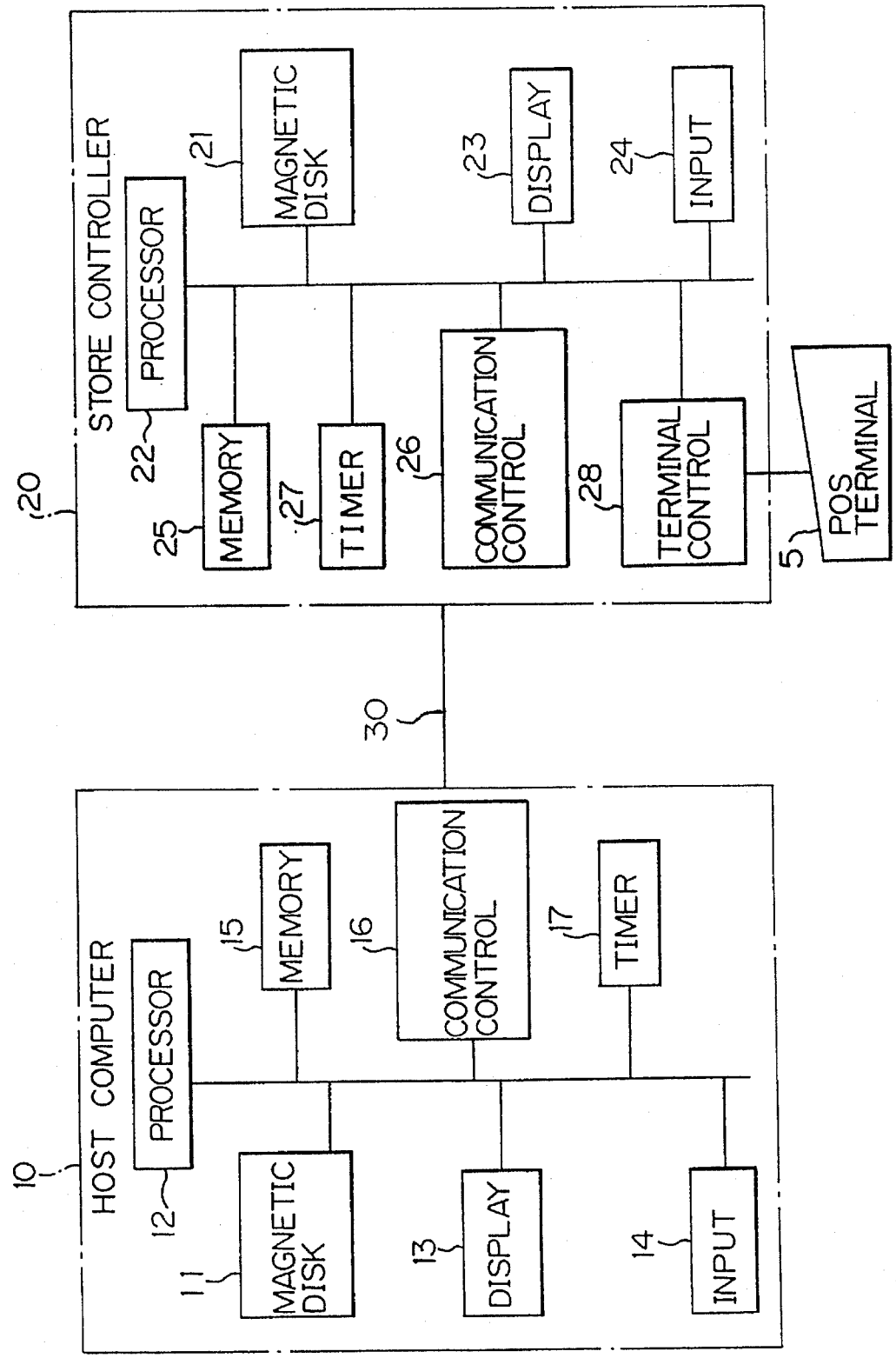
FIG. 3 is a block diagram schematically illustrating a specific configuration of the customer data processing system shown in FIG. 1.

FIG. 3 shows the specific configuration of the customer data processing system of the present invention. As shown in FIG. 3, the host computer 10 comprises a processor 12, a magnetic disc 11, a display unit 13, an input unit 14, a memory 15, a communication control 16, and a timer 17.

The customer data batch extracting means 12 shown in FIG. 1 is operated by the processor 12 shown in FIG. 3. Also, the ledger file 11 shown in FIG. 1 is stored in the magnetic disc 11 shown in FIG. 3.

The display unit 13 comprises a display device displaying various kinds of operational procedures to an operator on the site of the host computer 10, while the input unit 14 comprises a keyboard for use by the operator. The memory 15 comprises a semiconductor memory storing program sequences and parameters for operating the processor 12. The communication control 16 is a circuit for transmitting and receiving transaction messages to and from the store processor 20 on the telecommunications line 30. The timer 17 is provided for controlling automatic operation of the host computer 10, for example, for setting the time according to the opening time of stores having store controllers 20 so as to control the host computer 10 to execute batch extraction and transmission of customer data to the stores before the opening time.

The store controller 20 shown in FIG. 3 comprises a processor 22, a magnetic disc 21, a display unit 23, an input unit 24, a memory 25, a communication control 26, a timer 27, and a terminal control 28.

The remote updating means 22a, the local updating means 22b, and the customer data batch updating means 22c shown in FIG. 1 are all operated by the processor 22 shown in FIG. 3. Also, the sub-ledger file 21 shown in FIG. 1 is stored in the magnetic disc 21 shown in FIG. 3.

The display unit 23 comprises a display device displaying guidance indications to an operator who operates the store controller 20, while the input unit 24 comprises a keyboard provided for the operator. The memory 25 comprises a semiconductor memory storing program sequences and parameters for controlling operation of the processor 22. The communication control 26 is a control unit which controls transmission and reception of messages to and from the host computer 10 over the telecommunications line 30. The timer 27 is provided for controlling an automatic start and regular processing operation of the store controller 20, for example, for operating the local updating means 22b shown in FIG. 1 before a store opens to control preparation of the sub-ledger file and also for operating the customer data batch updating means 22c after the store is closed to cause transaction data stored in the sub-ledger file to be transmitted in batch to the host computer 10.

FIGS. 4A, 4B, and 4C shown an example of the contents of customer data stored in the ledger file 11A of the host computer 10 shown in FIG. 1. FIG. 4A shows the content of a credit balance management file 111. Stored in the credit balance management file 111 with respect to a specific customer are: a local branch office number of a bank (specifying the local branch office of the bank where the customer has an account), the account number of the customer, a credit balance for the account, an overdraft limit amount (indicating an amount allowable for lenting to the customer), a payable limit amount (indicating an amount allowable for payment to the customer), a password used for drawing a deposit, and warning codes (including "black list" data indicating delay in settlement of the account or difficulties caused by the customer in the Further, FIG. 4B shows the content of a customer management file 112. Stored in the user management file 112 are: a customer ID code allotted to a particular customer, a store number which is a number for a store where the customer has registered), information similar to those stored in the above-mentioned credit balance management file 11, such as a local branch office number of a bank, the customer's account number, and customer's attributes (consisting of various information which specifies the customer).

FIG. 4C shows the content of a merchandise purchase management file 113. The merchandise purchase management file 113 stores the history of merchandise purchased by a customer in the form of a list containing the date of purchase and merchandise codes according to the customer code stored in the customer management file 112.

Now, for example, when a transaction is sought by a particular customer, the host computer 10 refers to the customer management file 112 based on the customer code read by a credit card presented by the customer and checks the credit balance management file 111 according to the local branch office number of the bank and the account number. If the credit balance stored in the credit balance management file 111 is judged to be larger than the transaction amount of the customer, the transaction is concluded, and then the credit balance is updated by substracting the transaction amount therefrom. The host computer 10 updates the merchandise purchase management file 113 including the date of purchase and the merchandise codes according to the customer code. Basically, a transaction is executed in the above-mentioned order.

By the way, in the customer data management system of the present invention, customer data with a high frequency of use is extracted from the afore-mentioned ledger file 11, FIG. 1. The customer data with a high frequency of use is directed to customer data related to a customer who frequently purchases merchandises when the merchandise purchase management file 113 shown in FIG. 4C is referred to. Further, in the case of a credit transaction using a credit card, in order to avoid the transactional risk borne by stores or banks, the host computer 10 always checks whether or not each customer is listed on a black list. Consequently, customer data for customers listed on the black list is also extracted. In the case of a customer having a little probability of concluding transactions, it is necessary to check the customer information every time a transaction is sought. Consequently, customer data for such customers is likewise extracted.

Based on the afore-mentioned viewpoints, the host customer 10 establishes given standards for the history of purchased articles, number of purchases, existence of black list information, credit balance, etc., and checks the merchandise purchase management file 113 and the credit balance management file 111 to extract customer data with a high frequency of use, customer data for customers on the black list, and customer data for customers with a low credit balance (for example, less than ¥10,000. Customer data for customers who have seven or more transaction days in ten days or for customers who have transactions on a particular day, such as payday or a particular day of the week, may also be extracted for example.

Figure 5:
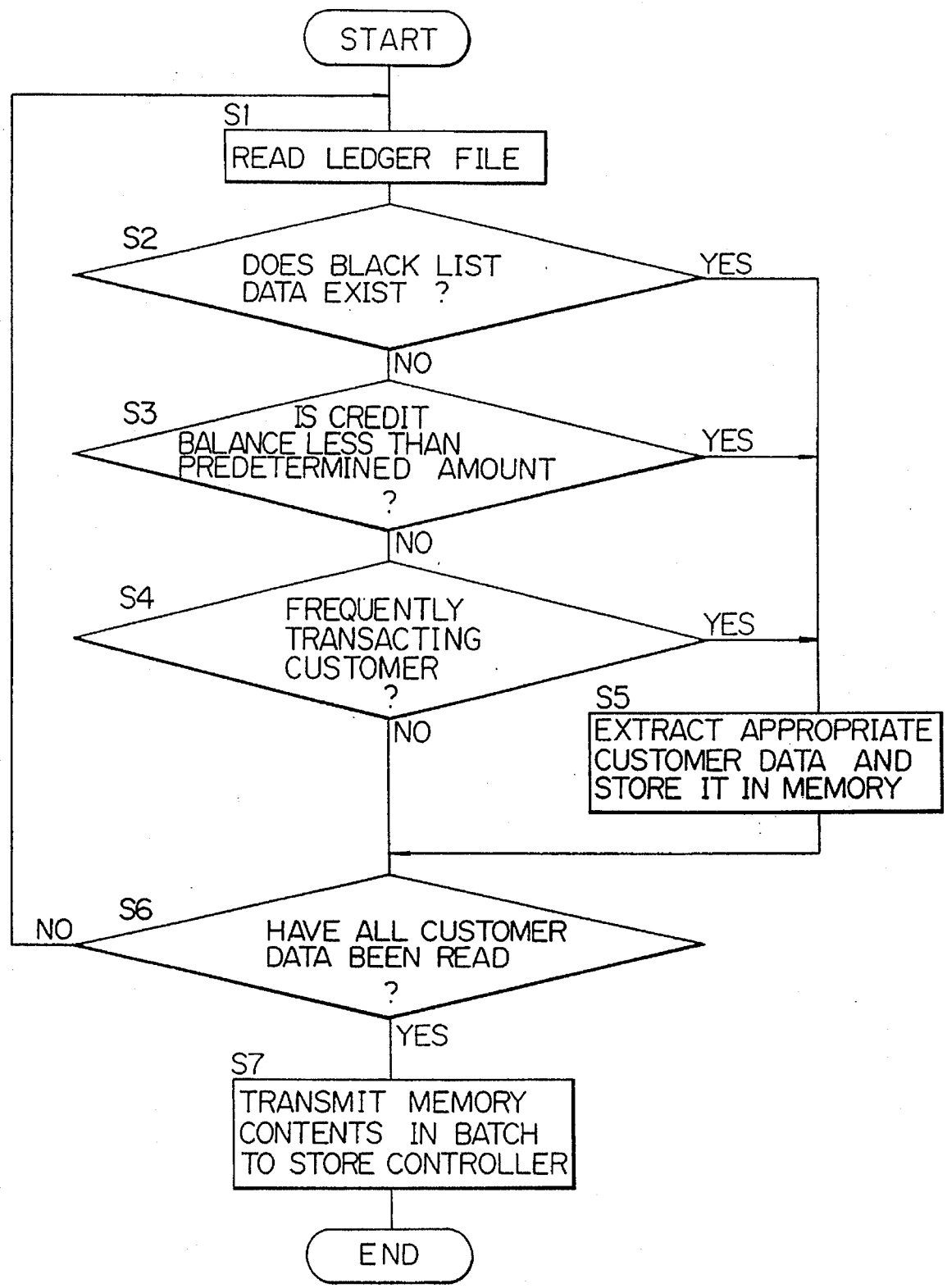
FIG. 5 is a flow chart showing a batch exraction method for extracting customer data stored at the host computer in the illustrative embodiment.

FIG. 5 shows the operation of the customer data batch extracting means 12 incorporated in the host customer 10 shown in FIG. 1. The customer data batch extracting means 12, as previously explained, extracts customer data with high frequency of use and so forth prior to the opening time of each store, for example, and transmits the extracted customer data in a batch to the store controller 20. The customer data batch extracting means 12 first reads the ledger file 11 and then extracts the relevant portion of information out of all the customer information in the previously mentioned procedure.

Concretely, in step S1 shown in FIG. 5, the customer data batch extracting means 12 reads the ledger file, then checks the credit balance management file 111, FIG. 4, to determine whether or not black list information is included (step S2), and further determines whether or not the credit balance is less than a predetermined amount (step S3). Subsequently, the customer data batch extracting means 12 refers to the merchandise purchase management file 113, FIG. 4, to determine whether or not the relevant customer is one who executes transactions very frequently (step S4). If the answer in steps S2, S3, or S4 is yes, the customer data batch extracting means 12 extracts the customer data with high frequency of use and stores it in a buffer memory not shown in the figure (step S5). Further, in the step S6 the customer data batch extracting means 12 determines whether or not all the customer data stored in the ledger file have been read and then repeats the steps from S2 to S5, inclusive. After the completion of the above-mentioned extraction of all the relevant information out of the ledger file, the customer data batch extracting means 12 proceeds to step S7 for executing batch transmission of the content stored in the buffer memory to the store controller 20. All the operation of the customer data batch extracting means 12 end with the step S7.

Figure 6A:
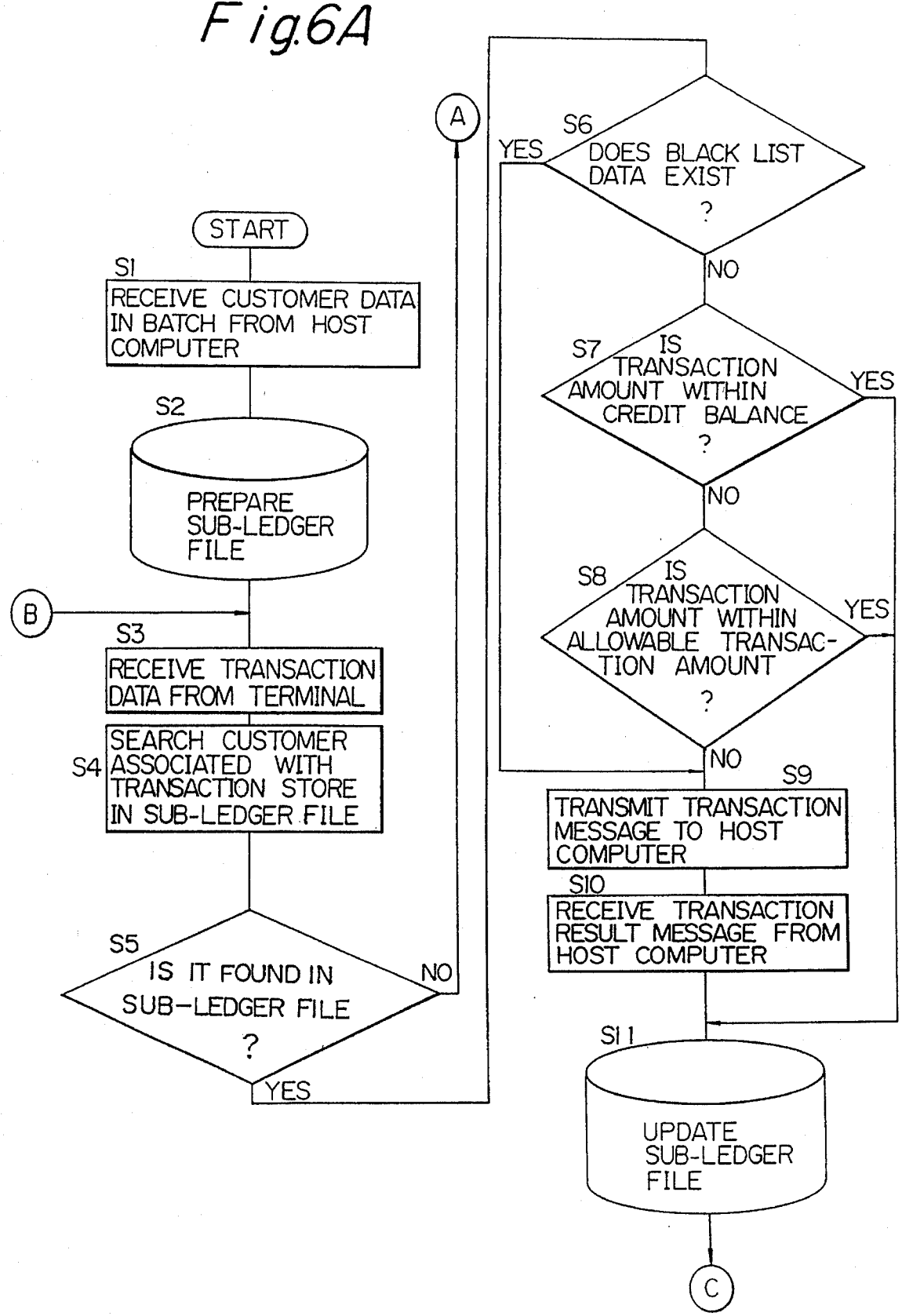
FIGS. 6A and 6B are flow charts showing procedures carried out by a store controller in the embodiment.
Figure 6B:
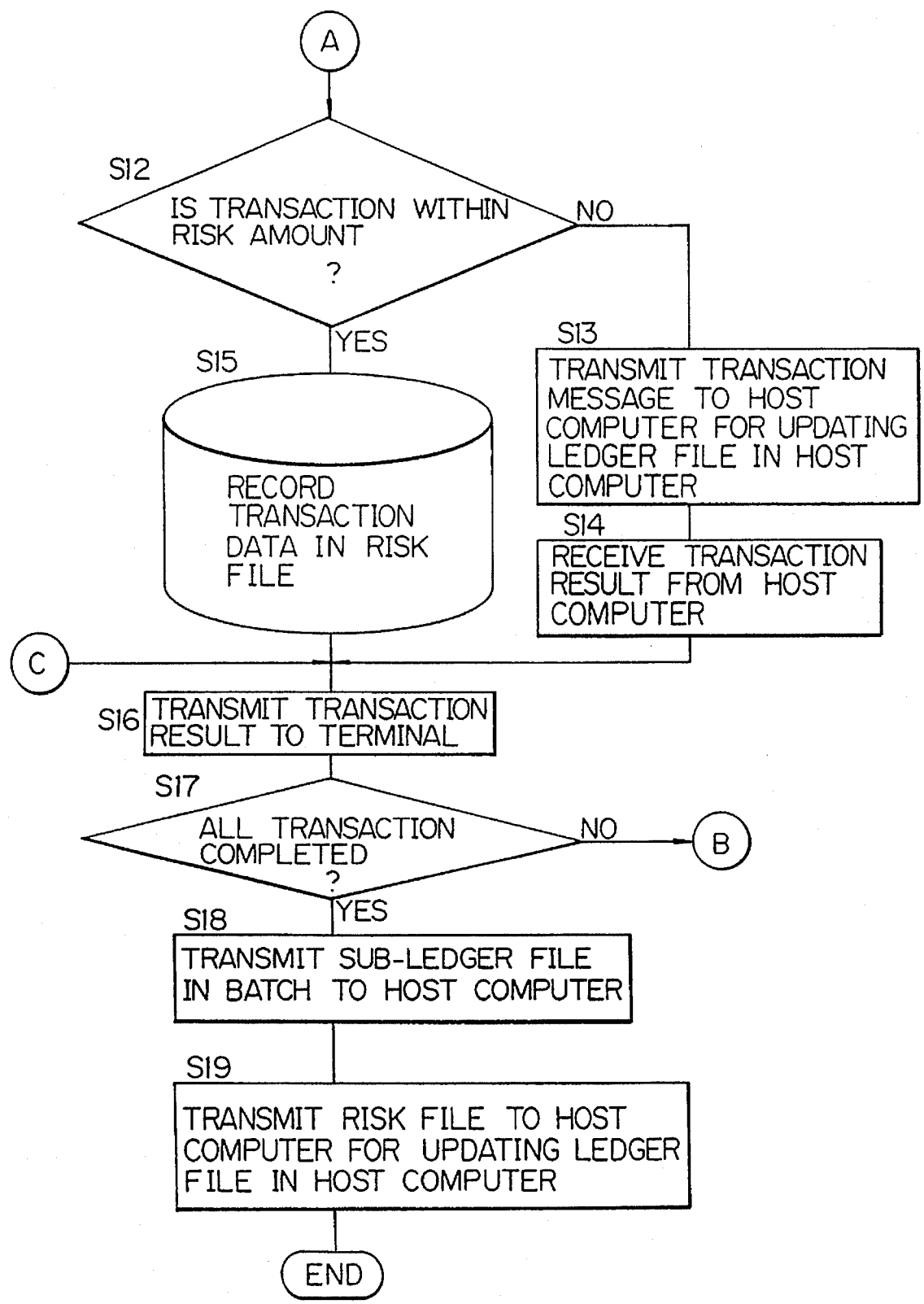

FIGS. 6A and 6B show the operation of the store controller 20. In the store controller 20, the local updating means 22b, FIG. 1, receives the afore-mentioned customer data in a batch from the host customer 10 (step S1), and then prepares a sub-ledger file having a composition similar to that of the ledger file in the store controller 20 (step S2). The processing in the steps S1 and S2 is executed before the opening time of the stores, for example.

Then, when a store is opened and the store controller 20 receives transaction data from the POS terminal 5 (step S3), the store controller 20 first searches the sub-ledger file to determine whether or not customer data related to a customer currently requesting a transaction have been stored in the sub-ledger file (steps S4 and S5). If the customer data have been stored in the sub-ledger file, the local updating means 22b (FIG. 1) starts operation to determine whether or not black list information is included in the customer data (step S6), whether or not the transaction amount is within the credit balance (step S7), and whether or note the transaction amount is within an allowable transaction amount (step S8).

Further, the allowable transaction amount is established on the basis of the payable limit amount of the overdraft limit amount indicated in the credit balance management file 111 shown in FIG. 4A in addition to an additional amount predetermined by a specific store. The establishment of such an additional amount predetermined by a specific store enables a customer to use a transaction mode in which a transaction may be concluded by depositing, after the transaction at the store, an additional amount of money in his or her bank. When the transaction is concluded, the sub-ledger file is updated (step S11).

For those customers who are designated by the black list information, the local updating means 22b proceeds from the step S6 to the step S9 to transmit a transaction message to the host customer 10 and receive a message including the transaction result therefrom (step S10), and then updates the sub-ledger file according to the content of the received message (step S11). Part or all of the transaction may fail to be concluded.

While, in the step S5, when it is not judged that no customer information is stored in the sub-ledger file, the local updating means 22b proceeds to the step S12 to start operation of the remote updating means 22a as shown in FIG. 1.

In the step S12, the remote updating means 22a first determines whether or not the transaction amount is within the range of a risk amount. Specifically, when the transaction amount is extremely small, the store controller 20 immediately concludes the transaction transmitting a transaction message to the host customer 10. Then, the remote updating means 22a proceeds to the step S15 to record the transaction data in a risk file. Further, if the transaction amount is more than the risk amount, the remote updating means 22a transmits a transaction message to cause the host customer 10 to update the ledger file in the host customer 10 (step S13). Then, a message containing the result of the transaction is sent from the host customer 10 to the remote updating means 22a (step S14).

After the completion of the step S11 in which the local updating means 22b updates the sub-ledger file, or after the completion of the step S15 in which the remote updating means 22a records the transaction data in the risk file, or after the completion of the step S14 in which the remote updating means 22a receives a message containing the transaction result from the host customer 10, the store controller 20 transmits the transaction result to the POS terminal 5 (step S16). With step S16 the transaction of the customer terminates, and whether or not all the transactions have been completed (that is, whether or not any other transactions still remain) is determined (step S17). When any other transactions remain, the remote updating means 22a returns to the step S3.

When a store closes and all the transactions are completed, the customer data batch updating means 22c, FIG. 1 transmits the content of the sub-ledger file previously updated to the host customer 10. The host customer 10, upon receipt of the sub-ledger file, updates the ledger file of the host customer 10 in a batch according to the content of the sub-ledger file. The batch updating means 22c also transmits the content of the risk file (for which on-line processing has been omitted) to the host customer 10 to update the ledger file of the host customer 10 (step S19). In the host customer 10, the ledger file is updated according to the content of the risk file.

Further, the afore-mentioned operation of the customer data batch updating means 22c may be executed after the closing time of a store, or an operator may start the operation even opening time of the store.

The same applies to the timing of the operation of the customer data batch extracting means 12 in the host customer 10. Specifically, the customer data batch extracting means 12 need not always be operated before the opening time of a store, but may be operated, for example, for batch transmission first in the morning or in the afternoon, or for batch transmission on a particular day of the week or at the end or the beginning of the month, especially for stores having relatively transactions. Also, taking a customer's transaction situation into account based on statistical data, the customer data batch extracting means 12 may be operated for batch transmission of user information at optimum intervals.

For batch transmission and batch updating as stated above, it is desirable to execute automatic control with the processor 12 and the timer 17 as previously explained referring to FIG. 3.

In addition, for example, if the storage capacity of the magnetic disc for storing the sub-ledger file in the store controller 20 is large, the content of the ledger file may be transmitted in a batch from the host customer 10 to the store controller 20 as required. It would then be unnecessary to determine, in step S5 as shown in FIG. 6, that no customer data exists in the sub-ledger file. Further, if the local updating means 22b shown in FIG. 1 determines that a transaction should not be concluded and treats the transaction as a failed one immediately, the remote updating means 22a shown in FIG. 1 need not be operated.

Still further, in an application which includes store controllers 20 provided in a plural number of stores connected to the host customer 10, when the host customer 10 transmits customer information for a particular customer as it is to the respective stores, the customer's credit balance data are also transmitted to those stores as it is. Therefore, if that customer transacts business with two or more stores within a short period of time, there is the possibility that a transaction will concluded beyond the regular credit balance. In order to avoid such transactions, when the credit balance in the ledger file is one million yen and there are five stores, for example, it is desirable to allocate each 200 thousand yen out of the credit balance to store to prepare a sub-ledger file for each store controller 20. As a result, the transaction limit amount for each store becomes small, but the customer can transact business freely with any one of the stores and each store can prevent transactions from being concluded beyond the allowable transaction amount of the store. Alternatively, a large sum can be allocated to a particular store according to the frequency of transactions by the customer.

The afore-mentioned illustrative embodiment is directed to an application of the present invention in a POS system for central management of customer information, in which host customer 10 is installed in a bank and store controllers are installed in stores, such as department stores. However, the store controllers 20 can be omitted if the POS terminal 5 is designed to execute the functions performed by the store controllers 20 in the illustrative embodiment. Further, according to the present invention, the customer data processing system is applicable to various types of systems, such as a terminal controller (TC) which controls automatic cash transaction equipment installed at financial institutions or chain stores.

As explained so far, in accordance with the present invention, the customer data processing system has the following benefits:

(i) Since customer data with a high frequency of use, out of the customer information managed by a host customer, is transmitted in advance to a processor in which transactions are processed, the number of transaction messages intercommunicated between the host customer and the processor decreases, resulting in high speed transaction processing.

(ii) Even if the host customer shuts down for some reason, or if telecommunications line between the host customer and the processor is disconnected, not all transactions become impossible.

(iii) Since customer data that should be managed by the host customer is substantially transferred and distributed to the respective processors for processing, even if a ledger file in the host customer should be damaged, it is easy to recover from the accident.

(iv) Since the number of communications between the host customer and the processor decreases and communication time is also shortened, security against wiretapping and so forth can be improved.

While the present invention has been described with reference to the particular illustrative embodiment, it is not restricted by the embodiment but only by the appended claims. It is to be appreciated that those skilled in the art can change or modify the embodiment without departing from the scope and spirit of the present invention.

What is claimed is:

1. A customer data processing system, comprising:

a host computer for managing customer data for a plurality of customers, the customer data for each customer including first data representative of a record of transactions by the respective customer;

a first processor for processing customer data; and a telecommunications line for interconnecting the first processor and the host computer, wherein the host computer includes
first storage means for storing the customer data,
data extracting means for extracting, from the first storage means, customer data for customers who have made transactions at a frequency higher than a predetermined level, and
transmission means for transmitting the extracted customer data in a batch over the telecommunications line to the first processor, wherein the first processor includes
second storage means for storing the customer data transmitted by the transmission means,
terminal means, interconnected with the second storage means, for entering second data representative of a transaction desired by a particular customer,
local updating means, operative in response to entry of the second data if the particular customer is a customer whose customer data is stored in the second storage means, for updating the customer data stored for the particular customer in the second storage means,
remote updating means, operative in response to entry of the second data if the particular customer is not a customer whose customer data is stored in the second storage means, for communicating with the host computer through the telecommunications line so that the customer data for the particular customer can be updated in the first storage means, and
batch updating means for transmitting customer data that has been updated by the local updating means in a batch over the telecommunications line to the host computer, wherein the customer data for each customer further includes third data representing a credit balance for the respective customer, wherein the customer data processing system further comprises at least one second processor interconnected to the host computer by another telecommunications line, each of the at least one second processors including a second storage means, an input means, a local updating means, a remote updating means and a batch updating means, wherein the customer data for each customer further includes fourth data representative of a first limited amount up to which the respective customer is allowed to establish a transaction, wherein the data extracting means of the host computer further comprises means for distributing the first limited amount for each customer to a plurality of second limited amounts each assigned to one of the first and the at least one second processors, the second limited amounts being included in the customer data and being transmitted to each of the first and the at least one second processors by the transmission means, and wherein the local updating means of a processor subtracts the second data entered by the terminal means for a particular customer from the second limited amount for the particular customer to update customer data stored in the second storage means of the particular processor within the second limited amount.

2. A processing system in accordance with claim 1, wherein the means for distributing distributes the first limited amount to the second limited amounts on the basis of a frequency at which the customer data for a customer, stored in the first storage means, has been made access to.

3. A processing system in accordance with claim 1, wherein the local updating means of a processor comprises means for reading out the customer data stored in said second storage means of the respective processor and for adding a predetermined, additional amount allotted to a customer to the second limited amount for the customer included in the customer data that has been read out, to establish an allowable transaction amount for the respective customer, and wherein the local updating means of the respective processor updates customer data stored in the second storage means of the respective processor within the allowable transaction amount in response to entry of the second data entered by the terminal means.

* * * * *